Figure 1:
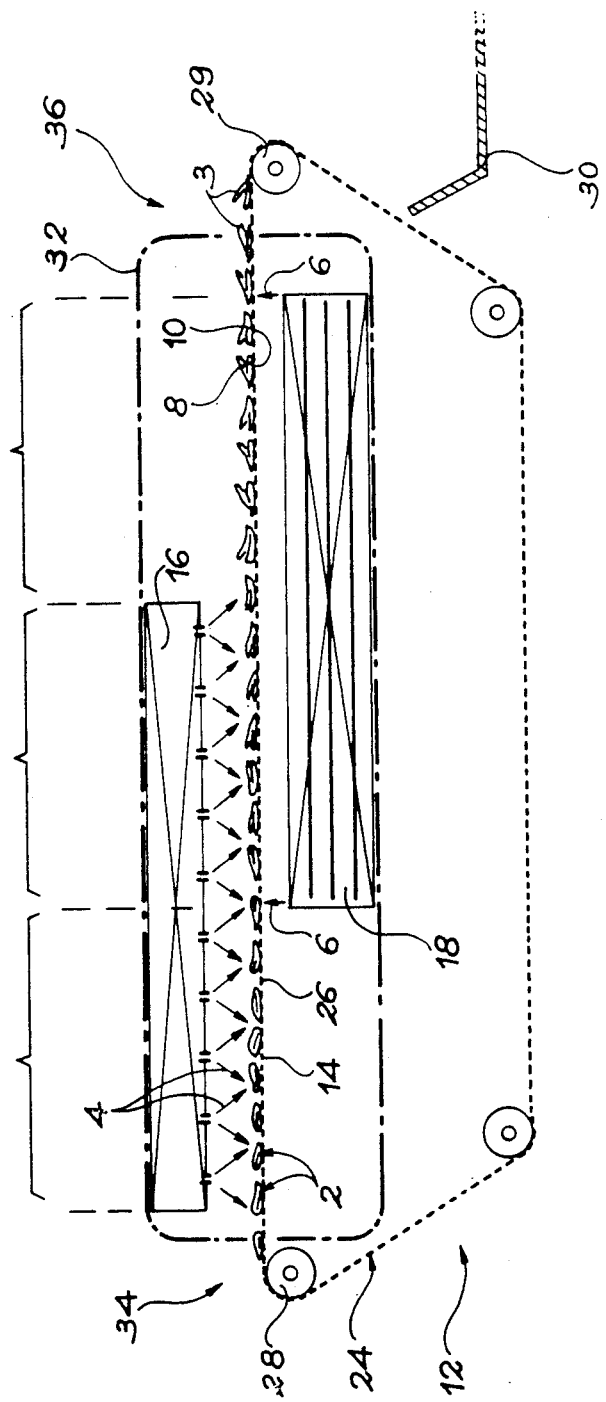

United States Patent [19]

Delplanque

[11] Patent Number: 4,951,356
[45] Date of Patent: Aug. 28, 1990

[54] PROCESS AND INSTALLATION FOR OPENING SHELLFISH

[75] Inventor: Pascal Delplanque, Vannes, France

[73] Assignee: Electricite de France Service National, Paris, France

[21] Appl. No.: 436,596

[22] Filed: Nov. 15, 1989

[30] Foreign Application Priority Data

Nov. 16, 1988 [FR] France ................. 88 14883

[51] Int. Cl.$^5$ ............................................. A22C 29/04
[52] U.S. Cl. ............................................ 17/74; 17/48
[58] Field of Search .............................. 17/74, 53, 48

[56] References Cited

U.S. PATENT DOCUMENTS

| | | | |
|---|---|---|---|
| 3,070,834 | 1/1963 | Carpenter | 17/45 |
| 3,203,034 | 8/1965 | Matzer et al. | 17/53 |
| 3,230,580 | 1/1966 | Marvin et al. | 17/48 |
| 3,585,676 | 6/1971 | Spracklin | 17/48 |
| 3,614,806 | 10/1971 | Henry | 17/74 |
| 3,755,855 | 9/1973 | Ouw et al. | 17/48 |
| 4,141,114 | 2/1979 | Carlson | 17/74 |
| 4,236,276 | 12/1980 | Van Twuyver | 17/48 |
| 4,255,834 | 3/1981 | Cambert | 17/74 |
| 4,313,241 | 2/1982 | Comparetto | 17/74 |
| 4,420,492 | 12/1983 | Taylor | 426/241 |
| 4,691,412 | 9/1987 | Brown | 17/74 |

FOREIGN PATENT DOCUMENTS 2030756 11/1970 France .

OTHER PUBLICATIONS

Vol. 17, No. 2, 1974 "Oyster Shucking with Infrared Radiation" by Wheaton.

*Primary Examiner*—Willis Little
*Attorney, Agent, or Firm*—Michael N. Meller

[57] ABSTRACT

The invention comprises subjecting shellfish (2) to infrared radiation (4,6) for a time preferably between 30 seconds and 3 minutes and involves three phases during which the shellfish (2) are exposed to radiation firstly from above, then over the entire shell surface and finally from below.

The installation comprises an endless conveyor (12) equipped with upper emitters (16) placed above the conveying part (14) and lower emitters (18) positioned laterally.

The invention is used in an industrial installation for washing, sand removal, preparation and conditioning of shellfish.

10 Claims, 3 Drawing Sheets

PROCESS AND INSTALLATION FOR OPENING SHELLFISH

The present invention relates to the automatic, continuous opening of shellfish and in particular within an industrial installation for ensuring the large-scale sand removal, cleaning, treatment, preparation and conditioning of shellfish.

The term "shellfish" is used throughout the description and claims and within the scope of the invention designates bivalve molluscs.

The problems considered in connection with the present invention are not only the opening of the shell of the mollusc, but also the detachment of the flesh from the upper and lower valves, whilst keeping the shell intact, the latter forming part of the marketed product. The blanching of the flesh, the good maintenance of the quality of the shellfish during storage in canned or deep-frozen form and the satisfactory efficiency of the operation with respect to the weight of the flesh also form part of the object of the present invention.

At present, the operations of opening, removing the flesh and blanching are carried out by soaking the shellfish in boiling water for several minutes, namely approximately 4 minutes. It is also possible to inject steam by means of an autoclave. These methods are subject to numerous constraints, particularly the discontinuous treatment of the shellfish, a large amount of handling of the products, a high energy consumption and a long and difficulty controlled opening time. Thus, as the size of the shells varies, certain shellfish require scalding for 2 minutes and others for 6 minutes. Thus, by applying an average time 25% of the shells open and complete detachment takes place, 50% open, but remain attached either to the upper or lower valve and finally 25% are not opened. On an industrial scale, it is consequently necessary to call on additional personnel.

Moreover, numerous disadvantages appear, such as poor working conditions, e.g. fumes, heat, handling boiling products, etc. There is finally a potential deterioration of the taste and appearance qualities of the products caused by possible excessive boiling and by the effect of the soaking operation, which also means that the bacterialogical quality of the thus treated shellfish becomes problematical.

The object of the invention is to obviate these disadvantages and supply an installation which can be integrated into a chain for the preparation and conditioning of shell-fish on an industrial scale.

Thus, the main object of the invention is a process for opening shellfish consisting of subjecting the latter to infrared radiation with a wavelength between 0.75 and 2 micrometres and involving the following three successive phases:

(a) exposure of the shellfish to radiation from above over a first half of their outer surface, (b) exposure of the shellfish to radiation from above and below over the entire outer surface of the shellfish and (c) exposure of the shellfish to radiation from below only over the second half of their outer surface.

The three phases preferably last the same amount of time.

The process is particularly effective when the power per unit area is between 30 and 70 kW/m$^2$.

Another main object of the invention is an installation for opening shellfish using the process summarized hereinbefore. It mainly comprises a conveyor having a conveying part on which are placed the shellfish, upper radiation conveyors placed above and vertical with respect to the conveying part on two first zones corresponding to the first two phases and oriented so as to direct their radiation onto said conveying part and lateral radiation emitters placed outside the vertical projection of the upper conveying part on two final zones corresponding to the last two phases and oriented so as to direct their radiation towards the conveying part.

In preferred manner, the lower emitters are installed on two sides of the conveyor. Moreover, they are installed so as to orient in parallel their radiations and are of the parabolic reflector type, so as to emit parallel radiation.

The conveyor is preferably terminated by a receptacle for receiving the open shellfish.

There are two possible emitter shapes. The first is elliptical and is more particularly suitable for the upper emitters, whilst the second is parabolic and is better suited to the lower emitters.

The invention is intended to be integrated into an industrial installation for the washing, sand removal, preparation and conditioning of shellfish.

The invention is described in greater detail hereinafter relative to non-limitative embodiments and the attached drawings, wherein show:

FIG. 1 a profile view of the installation according to the invention.

Figure 2:
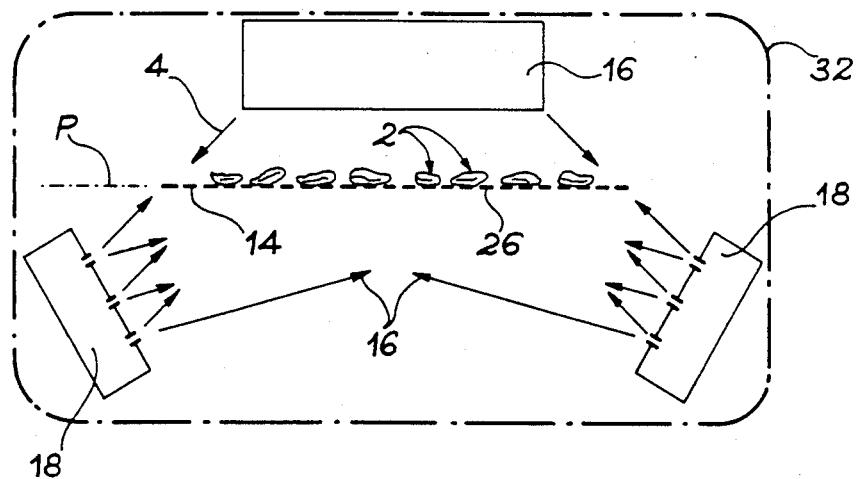

FIG. 2 a vertical section of the same installation according to the invention.

Figure 3:
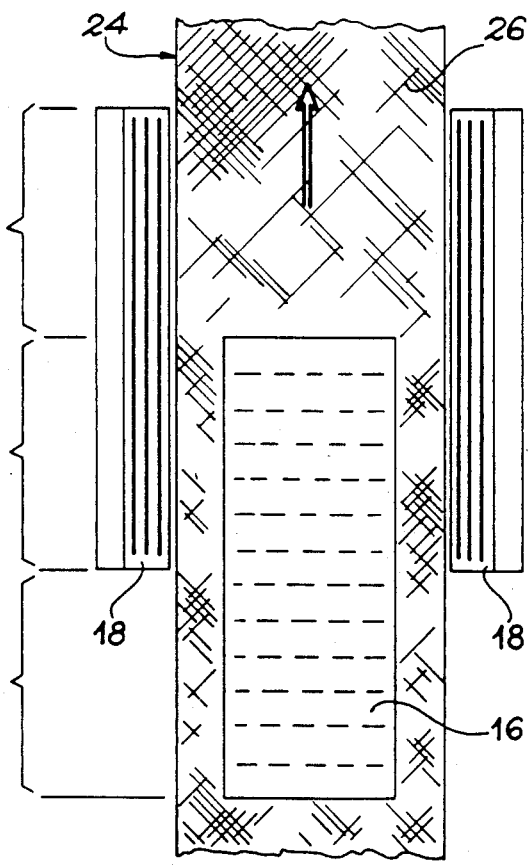

FIG. 3 a plan view of the same installation according to the invention.

Figure 4:
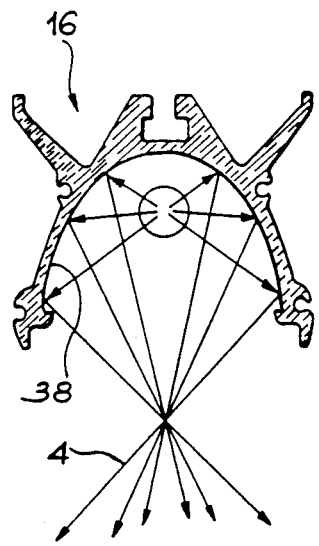

FIG. 4 a first realization of radiation emitters used in the invention.

Figure 5:
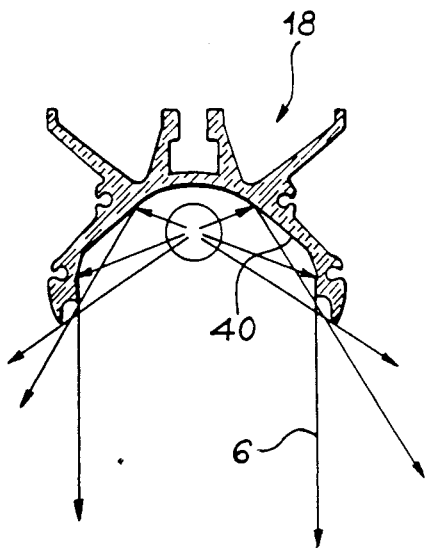

FIG. 5 a second realization of radiation emitters used in the invention.

Figure 6:
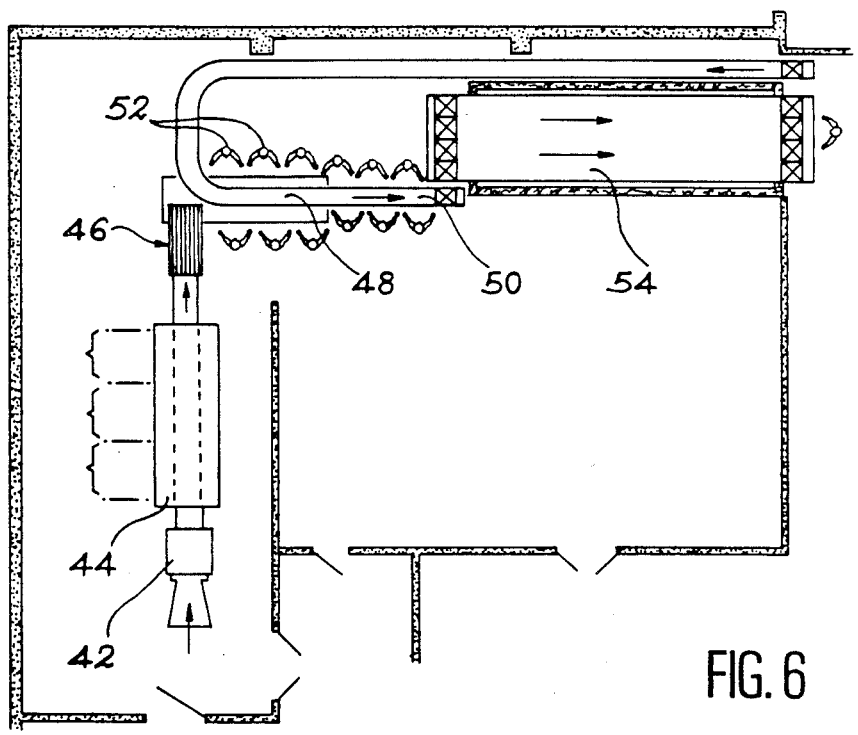

FIG. 6 an industrial installation relating to the preparation and conditioning of shellfish and into which the invention is integrated.

The present inventive concept is the process and the performance of a process for the opening of different shellfish types of the bivalve mollusc type using infrared radiation. Particular effectiveness is ensured in the case where the wavelength thereof is between 0.75 and 2 micrometres.

Thus, numerous tests have been carried out with different types of shellfish, such as scallops, mussels, hard and soft clams. Certain of these shellfish were tested in their fresh form and in their frozen form.

As a function of the products, the process is effective when the radiation is applied for between 30 seconds and a few minutes, generally 3 minutes. The process can be performed without interruption when using an endless conveyor permitting continuous working. A metal mesh, e.g. stainless steel conveyor makes it possible to perform the process according to the invention.

It is particularly effective when it comprises the three following stages. The first consists of exposing the shellfish 2 in FIGS. 1, 2 and 3 to higher radiation 4, via a first upper half of their outer surface. With the shellfish 2 previously closed, the higher infrared radiation 4 emitted in this way acts on said upper part of the shell and then, after a certain time, on the flesh of the organs in contact with the shell. These organs are the elastic ligament connecting the two parts of the shell and the adductor muscle which brings about the closing of the shell and keeps the two parts tightly closed. Once these organs are subject to the heat transmitted by the upper part of the shell, they are detached from the latter or expand and the shell starts to open. The water contained in the shellfish then escapes and the heat transmitted beforehand by conduction of the water through the upper part is no longer correctly transmitted to the rest of the shellfish. Thus, the invention provides for a second process phase during which the shellfish is exposed both to higher infrared radiation 4 and lower infrared radiation 6, in order to heat the shellfish from the bottom. Once this heating through the upper part of the shell is no longer effective, the action of the higher radiation 4 is stopped. The respective durations of the three phases are determined as a function of the characteristics of the product, but preferably these three phases have the same predetermined time T.

Numerous mechanical, dimensioning and performance criteria of the process influence its efficiency. However, the power per unit area of the radiation to be applied to the shellfish is between 30 and 70 kW/m$^2$ in order to obtain the optimum results. This power is dependent on the type of shellfish, its size and its fresh or frozen state. The duration of the treatment is also dependent on the shellfish. Thus, there is an optimum power - time pair.

In the case where a conveyor is used, the power of the emitters is a function of the conveyor surface and its displacement speed and consequently the flow rate of the product to be treated.

It is obvious that numerous settings and adjustments can be carried out during the performance of the process, taking account of the latter and the types of shellfish to be opened. In particular, a performance applies to a single product type could be subject to very precise settings, which are particularly appropriate for this shellfish type. In particular, the conveyor travel speed is regulatable in order to be able to apply the power - time pair adapted to the shellfish to be treated.

Thus, the process according to the invention permits a continuous opening of said shellfish, a minimum handling and a possibility of visually checking the boiling level of the seafood and the shellfish opening time. It also avoids soaking during opening, so that the organoleptic and bacterialogical properties are retained. It also avoids any giving off of fumes and excessive heat. There is also a high energy efficiency of approximately 50% compared with the prior art system.

The shellfish opening installation according to the invention is shown in profile view in FIG.1. The main elements of this installation are a conveyor 12 and radiation emitters 16 and 18.

Conveyor 12 is constituted by return rollers 28,29, whereof at least one is rotated by not shown motor means. A conveying chain 24 is placed in taut manner around and between the return rollers 28,29. Between the two upper return rollers 28,29, is located a conveying part 14 on which is located the shellfish to be opened. The latter can be placed on a first upstream end 34 of said conveying part 14 using any random handling means. The rotation of the return rollers 28,29 leading to a translation of the conveying chain, so that the shellfish 2 placed on the latter are moved to the second downstreams end 36 of conveying part 14. As the conveying chain 24 is moved by a reduced distance to the first end 34 of the conveying part 14, the open shellfish 3 can be collected in a receptacle 30 positioned below said second end 36 of conveying part 14.

Taking account of the peripheral arrangement of the radiation emitters 4 and 6 and the nature of the emitted radiation, the conveying chain 24 is made from a material transparent to infrared radiation, so that the latter can reach the shellfish 2. This material must also permit the escape of a liquid such as water, to enable the shellfish 2 to be drained of the water which they give up during said opening process. To this end, the chain is preferably constituted by metal meshes 26, which are more specifically made from stainless steel. Thus, the metal meshes 26 enable the radiation to reach all points of the outer surface of the shellfish to be opened.

The first three drawing show several upper emitters 16, arranged side by side, above and vertically of the first two thirds of the conveying part 14, at a predetermined distance corresponding to the first two phases of the process. They are spaced in such a way that, if they are divergent, the radiation emitted by the adjacent upper emitters 1 overlaps at the shellfish 2 placed on conveyor belt 24. This arrangement is applicable when using elliptical radiation emitters emitting divergent rays 4.

The lower emitters 18 are positioned alongside conveyor 12 below plane P, where are set down the shellfish 2 and, more specifically, outside the vertical projection of the conveying part 12, so as to avoid water resulting from the draining of the shellfish. They are oriented so as to direct their radiation 6 below the conveying chain 24 into the conveying part 14. As the conveying chain 24 is made from a material transparent to infrared radiation, the radiation 6 of the lower emitters 18 traverses said chain and strikes each shellfish 2 on the lower outer part of the shell.

With reference to FIG.2, the lower emitters 18 emit parallel, adjacent rays 6, so as to cover the entire lower surface of the conveying chain 24 level with the conveying part 14. A particularly effective arrangement is for the lower emitters 18 to be oriented by an angle of 30° with respect to the horizontal plane P.

The motor means for driving the conveying chain 24 are not shown, but can be constituted either by an electric motor with a speed variator, or by an electric stepping motor, the steps corresponding to the three phases of the process and to the three working zones.

FIG.2 shows in mixed line form the section of a tunnel 32 constituting a thermal fairing for the conveying part in order to avoid heat losses. As it is open at each end, it also enables an observer to monitor the operation.

FIG.4 shows an emitter construction, whereof the inner reflecting surface 38 is elliptical. Such a shape produces firstly a convergent and then a divergent beam. According to the main embodiment of the invention such emitters are used as the upper emitters.

FIG.5 shows a second emitter construction used in the invention and for which the shape of the inner reflecting surface 40 is parabolic. Such an arrangement enables an emitter to supply a beam, whereof most of the rays are parallel. Such an emitter type is more particularly used for forming the lateral emitters.

The reflecting inner surfaces 38 and 40 can either be of highly polished aluminium, or can be equipped with a gold-coated reflecting plate.

The infrared radiation is generated by a vacuum tungsten filament quartz tube, the filament being at a temperature of 2200° C. At this temperature, the wavelength of the radiation is between 0.75 and 2 micrometres. The air necessary for the cooling of the ends of the quartz tubes is supplied by a ventilation half-case. It also avoids noxious vapours from rising towards the emitter.

With respect to FIG. 6, the shellfish opening installation according to the invention is intended to be integrated into an industrial installation producing conditioned seafood for marketing.

The shellfish opening installation 44 according to the invention can be placed in a shellfish preparation chain just following a jet sand removal and washing machine 42. When the shellfish is open, a further washing is necessary. To this end, the outlet of the shellfish opening installation 44 is directly followed by a machine 46 incorporating a cylinder for washing and separating the seafood from the shells, the operating taking place in a brine tank. The outlet of said latter machine 46 leads to the start of a shellfish reconstitution zone 48, followed by a gun buttering zone 50, where staff 52 are required. This reconstitution and buttering zone is followed by a deep-freezing tunnel 54 from which the deep-frozen products are conditioned and are ready for transportation and marketing.

Thus, the shellfish opening installation according to the invention can be integrated into a continuously operating industrial installation. The shellfish opening station no longer requires staff and involves minimum handling. It permits the installation of equipment for checking the shellfish opening times and the seafood boiling level. Thus, there is no soaking in boiling water during opening, which helps to preserve good bacteriological properties of the products, together with their organoleptic properties.

Finally, the installation according to the invention avoids the presence of fumes or excessive heat present in the prior art installation.

I claim:

1. Process for opening shellfish (2) consisting of subjecting the latter to infrared radiation (4,6) with a wavelength between 0.75 and 2 micrometres and involving the following three successive phases:
    (a) exposure of the shellfish (2) to radiation from above (4) over a first half (8) of their outer surface,
    (b) exposure of the shellfish (2) to radiation from above (4) and below (6) over the entire outer surface (8,10) of the shellfish (2) and
    (c) exposure of the shellfish (2) to radiation from below (6) only over the second half of their outer surface.

2. Process according to claim 1, characterized in that the three phases last the same amount of time.

3. Process according to claim 1 characterized in that the power per unit area of the radiation is between 30 and 70 $kW/m^2$.

4. Apparatus for opening shellfish, characterized in that it comprises a conveyor (12) permeable to infrared radiation (4,6) and to liquids, which has a conveying part (14) on which are placed the shellfish (2), upper infrared radiation emitters (16) placed above and vertically of the conveying part (14) on two first zones corresponding to the first two phases and oriented so as to direct their radiation (4) onto conveying part (14) and lower infrared radiation emitters (18) placed outside the vertical projection of the conveying part (14) on two latter zones corresponding to the two last phases and oriented to direct their radiation (6) towards the lower face of conveying part (14).

5. Apparatus according to claim 4, characterized in that the lower emitters (18) are installed on both sides of the conveyor (12).

6. Apparatus according to claim 4, characterized in that the lower emitters (18) are installed so as to partly reciprocally orient in parallel the radiations (6) thereof and in that they are of the parabolic reflector type (38), so as to emit parallal rays (6).

7. Apparatus according to claim 4, characterized in that the upper emitter (16) are of the elliptical reflector (40) type, so as to emit divergent rays (6).

8. Apparatus according to claim 4, characterized in that it comprises a receptacle (30) placed following the conveyor (12) in order to receive the open shellfish (3).

9. Apparatus according to claim 4, characterized in that the conveyor (12) incorporates an endless chain (24) permeable to the infrared radiation and to liquids and installed so as to constitute the conveying part (14).

10. according to claim 4, used in an industrial installation for the washing, sand removal, preparation and conditioning of shellfish (2).

* * * * *